(12) United States Patent
Murata

(10) Patent No.: US 8,322,107 B2
(45) Date of Patent: Dec. 4, 2012

(54) WIND TURBINE TOWER AND WIND TURBINE GENERATOR

(75) Inventor: Hajime Murata, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 102 days.

(21) Appl. No.: 12/674,979

(22) PCT Filed: Nov. 30, 2009

(86) PCT No.: PCT/JP2009/070112
§ 371 (c)(1),
(2), (4) Date: Apr. 15, 2010

(87) PCT Pub. No.: WO2011/064886
PCT Pub. Date: Jun. 3, 2011

(65) Prior Publication Data
US 2011/0254277 A1 Oct. 20, 2011

(51) Int. Cl.
*E04H 12/22* (2006.01)
(52) U.S. Cl. ........... 52/652.1; 52/167.8; 52/167.7; 52/651.01; 138/120; 138/155
(58) Field of Classification Search ........... 52/40, 167.7, 52/167.8, 652.1, 651.11, 648.1, 650.1, 650.2, 52/651.01, 651.02, 651.04, 651.06, 651.07, 52/651.08, 651.09, 845; 138/155, 120
See application file for complete search history.

(56) References Cited

U.S. PATENT DOCUMENTS

| 2,567,958 | A | * | 9/1951 | Mummert | ............. | 220/567 |
| 2,618,746 | A | * | 11/1952 | Pauch | ............. | 343/742 |
| 2,705,061 | A | * | 3/1955 | Getz | ............. | 52/114 |

(Continued)

FOREIGN PATENT DOCUMENTS

JP 2002-30830 A 1/2002

(Continued)

OTHER PUBLICATIONS

Canadian Office Action dated Jun. 22, 2012, issued in corresponding Canadian Patent Application No. 2,696,084. (2 pages).

*Primary Examiner* — William Gilbert
*Assistant Examiner* — Alp Akbasli
(74) *Attorney, Agent, or Firm* — Westerman, Hattori, Daniels & Adrian, LLP

(57) ABSTRACT

A wind turbine tower in which a horizontal force received by an upper part of the tower is dispersed to a lower part of the tower or to a base so as to reduce the load acting on a tower shell and suppress deformation of the tower caused by an external force is provided. A monotype-type wind turbine tower 2 in which mainly a tower shell 21 is configured to bear load includes a platform 22 connected to an inner wall of the tower shell 21 and dividing an internal space of the tower in the vertical direction; an elastic bearing 30 attached by fixing one end thereof to the platform 22; and a load transmission member 23 disposed in the internal space of the tower and connecting another end of the elastic bearing 30 to the platform 22 located at a position facing the elastic bearing 30 or to a base B so as to transmit a horizontal force from the elastic bearing 30 to the tower shell 21 or the base B.

5 Claims, 4 Drawing Sheets

U.S. PATENT DOCUMENTS

| | | | |
|---|---|---|---|
| 3,794,277 A * | 2/1974 | Smedley et al. | 248/548 |
| 3,815,371 A * | 6/1974 | Koehler | 405/227 |
| 4,295,317 A * | 10/1981 | VanTielen | 52/637 |
| 4,314,434 A * | 2/1982 | Meisberger | 52/651.02 |
| 4,338,752 A * | 7/1982 | Stanelle | 52/194 |
| 4,511,115 A * | 4/1985 | Ludwigsen | 248/562 |
| 4,625,478 A * | 12/1986 | Goode | 52/197 |
| 4,659,940 A * | 4/1987 | Shepard | 290/55 |
| 4,860,507 A * | 8/1989 | Garza-Tamez | 52/167.4 |
| 4,886,397 A * | 12/1989 | Cherbonnier | 405/195.1 |
| 4,920,710 A * | 5/1990 | Paine | 52/108 |
| 5,040,948 A * | 8/1991 | Harburg | 416/85 |
| 5,097,647 A * | 3/1992 | Sopik et al. | 52/651.07 |
| 5,375,353 A * | 12/1994 | Hulse | 40/217 |
| 5,439,060 A * | 8/1995 | Huete et al. | 166/367 |
| 5,608,416 A * | 3/1997 | Champion et al. | 343/773 |
| 5,642,966 A * | 7/1997 | Morrison et al. | 405/195.1 |
| 5,775,038 A * | 7/1998 | Sauvageot | 52/167.8 |
| 5,870,877 A * | 2/1999 | Turner | 52/651.02 |
| 6,085,471 A * | 7/2000 | Axon | 52/167.4 |
| 6,161,359 A * | 12/2000 | Ono | 52/651.1 |
| 6,320,273 B1 * | 11/2001 | Nemec | 290/55 |
| 6,463,709 B2 * | 10/2002 | Meguro et al. | 52/653.1 |
| 6,713,891 B2 * | 3/2004 | Kirkegaard et al. | 290/44 |
| 7,571,577 B2 * | 8/2009 | Nanayakkara | 52/250 |
| 7,735,290 B2 * | 6/2010 | Arsene | 52/651.01 |
| 7,739,843 B2 * | 6/2010 | Cortina-Cordero | 52/223.5 |
| 7,877,934 B2 * | 2/2011 | Livingston et al. | 52/40 |
| 8,016,268 B2 * | 9/2011 | Oliphant et al. | 254/278 |
| 2005/0166521 A1 * | 8/2005 | Silber | 52/633 |
| 2006/0213145 A1 * | 9/2006 | Haller | 52/651.01 |
| 2008/0036683 A1 * | 2/2008 | Schadler | 343/878 |
| 2008/0078083 A1 * | 4/2008 | Livingston et al. | 29/897.31 |
| 2008/0265478 A1 * | 10/2008 | Smith et al. | 267/124 |
| 2009/0249707 A1 * | 10/2009 | Curme | 52/40 |
| 2010/0096861 A1 * | 4/2010 | Bak | 290/1 R |
| 2010/0213717 A1 * | 8/2010 | Roseman | 290/55 |
| 2011/0006534 A1 * | 1/2011 | Achard et al. | 290/54 |
| 2011/0025070 A1 * | 2/2011 | Price | 290/55 |
| 2011/0037264 A1 * | 2/2011 | Roddier et al. | 290/44 |
| 2011/0072739 A1 * | 3/2011 | Moreno et al. | 52/167.5 |
| 2011/0123346 A1 * | 5/2011 | Hancock | 416/241 A |
| 2011/0200425 A1 * | 8/2011 | Weaver | 415/7 |
| 2011/0203219 A1 * | 8/2011 | Kristensen | 52/745.17 |

FOREIGN PATENT DOCUMENTS

| | | |
|---|---|---|
| JP | 2008-540918 A | 11/2008 |
| WO | 2006/124562 A2 | 11/2006 |

* cited by examiner

WIND TURBINE TOWER AND WIND TURBINE GENERATOR

TECHNICAL FIELD

The present invention relates to a monopole-type wind turbine tower (pillar) and a wind turbine generator equipped with such a wind turbine tower.

BACKGROUND ART

A wind turbine generator is a device that generates electricity by causing a rotor head equipped with wind turbine blades to rotate in response to a wind force and then increasing the speed of the rotation using a speed-increasing gear.

The aforementioned rotor head is disposed on the top of a wind turbine tower (referred to as "tower" hereinafter), is attached to an end of a yawable nacelle, and is supported in a rotatable manner about a rotation axis extending substantially in the horizontal direction.

In general, the aforementioned wind turbine tower often employs a steel monopole type that uses a cylindrical shell. In such a steel-monopole-type tower, since the cylindrical shell are composed of steel serves as the main reinforcement member, the cross-sectional efficiency is enhanced by increasing the outer diameter of the shell. Therefore, in a steel-monopole-type tower, it is desirable to maximize the outer diameter of the shell within a range allowing a reduction in weight.

On the other hand, a proposed example of a tower for a wind turbine generator employs a space-frame structure in which at least one of a longitudinally extending member and a diagonally extending member is made to serve as a damping member for damping an anti-cyclic gust or sustained high-speed wind (for example, see Patent Citation 1).

Patent Citation 1:
Japanese Translation of PCT International Application, Publication No. 2008-540918

DISCLOSURE OF INVENTION

Wind turbine generators in recent years tend to be large in size due to an increase in the length of wind turbine blades. Therefore, an increase in the height of the tower and an increase in the weight of the nacelle disposed on the top of the tower are unavoidable.

On the other hand, the external diameter of the tower need to satisfy various constraints, such as transportation conditions, for example, a size that is constrained by the transportation route and a weight that is constrained by the means of transportation. Therefore, when designing the tower, the external dimensions of the tower are set as large as possible within the constraint range for transportation or the like, and the required rigidity is generally ensured by adjusting (increasing) the shell thickness of the tower.

However, when a wind turbine generator is increased in size, the rigidity required for the tower also increases, and since there is a limit to increasing the external diameter of the tower to deal with this, it can be expected that the required shell thickness may exceed a manufacturable thickness range.

Construction of a wind turbine generator involves a procedure of connecting multiple divided tower sections so as to obtain a tower with a required height and then installing a device, such as a nacelle, at the uppermost part of the completed tower; however, since the tower height and the weight load on the tower vary with each construction phase, the resonant wind speed of the tower also varies with each construction phase.

On the other hand, a wind power plant is normally constituted of multiple (many) wind turbines, and from the standpoint of increased efficiency of the construction process and reduction of construction costs, a construction procedure in which the tower sections are partly constructed using a relatively small crane prior to installation of a device, such as a nacelle, using a large crane is sometimes employed. When such a construction method is employed, since an unattended period in the mid-phase of construction is extended, a countermeasure for, for example, limiting the unattended period is necessary depending on the resonant wind speed in that state.

Based on such a background, in a monopole-type tower of a wind turbine generator in which a tower shell composed of steel or the like is load-bearing, it is necessary to minimize an increase in the external diameter of the tower and an increase in the shell thickness associated with an increase in size of the wind turbine generator by reducing the load acting on the tower shell, and it is demanded that the constraints with respect to the construction process be alleviated by suppressing deformation of the tower in the mid-phase of construction.

The present invention has been made in view of these circumstances, and an object thereof is to provide a monopole-type wind turbine tower and a wind turbine generator equipped with the same, in which a horizontal force received by an upper part of the tower is dispersed to a lower part of the tower or to a base so as to reduce the load acting on a tower shell and suppress deformation of the tower caused by an external force.

In order to solve the aforementioned problems, the present invention provides the following solutions.

In a monopole-type wind turbine tower according to an aspect of the present invention in which mainly a tower shell is configured to bear load, the wind turbine tower includes a platform connected to an inner wall of the tower shell and dividing an internal space of the tower in the vertical direction; an elastic bearing attached by fixing one end thereof to the platform or a base; and a load transmission member disposed in the internal space of the tower and connecting another end of the elastic bearing to the platform located at a position facing the elastic bearing or to the base so as to transmit a horizontal force from the elastic bearing to the tower shell or the base.

Since such a wind turbine tower includes the platform connected to the inner wall of the tower shell and dividing the internal space of the tower in the vertical direction, the elastic bearing attached by fixing one end thereof to the platform or the base, and the load transmission member disposed in the internal space of the tower and connecting another end of the elastic bearing to the platform located at a position facing the elastic bearing or to the base so as to transmit a horizontal force from the elastic bearing to the tower shell or the base, the horizontal force received by the upper part of the wind turbine tower can be dispersed to the lower part of the tower or to the base, thereby reducing the load acting on the interior of the tower shell and suppressing deformation of the wind turbine tower caused by an external force.

In the above aspect, it is preferable that the elastic bearing be anti-seismic multilayer rubber attached in a state where the multilayer rubber is pre-compressed by the load transmission member, whereby delamination of the multilayer rubber can be prevented even when a tensile force is applied to the elastic bearing.

In the above aspect, it is preferable that the tower shell include a joint section that connects multiple divided tower sections and that the load transmission member be joined to the tower shell between the tower sections that are different from each other, whereby the load acting on the joint section can be reduced.

In the above aspect, a spring constant of the elastic bearing may be set in accordance with an expected reduction of the load acting on the tower shell.

Specifically, by taking into consideration the spring constant of the elastic bearing so as to endow it with an appropriate ability to suppress deformation caused by an external force upon completion or in the mid-phase of construction, constraints with respect to the construction process can be alleviated.

In a wind turbine generator according to an aspect of the present invention that generates electricity by causing a rotor head that rotates about a substantially horizontal rotation axis when a wind turbine blade receives a wind force to drive a generator disposed within a nacelle, the wind turbine generator includes a wind turbine tower as the above aspect, that stands upright on a base, and the nacelle is disposed on top of the wind turbine tower.

With such a wind turbine generator, since the wind turbine tower as the above aspect, that stands upright on the base is included and the nacelle is disposed on the top of the wind turbine tower, the horizontal force received by the upper part of the wind turbine tower can be dispersed to the lower part of the tower or to the base by the elastic bearing so as to reduce the load acting on the interior of the tower shell and suppress deformation of the wind turbine tower caused by an external force, thereby minimizing an increase in the external diameter of the tower and an increase in the shell thickness and avoiding constraints, such as a transportation restriction, so as to allow for an increase in size of the wind turbine generator.

According to the wind turbine generator described above, it is possible to provide a monopole-type wind turbine tower and a wind turbine generator equipped with the same, in which the horizontal force received by the upper part of the wind turbine tower is dispersed to the lower part of the tower or to the base so as to reduce the load acting on the tower shell and suppress deformation of the tower caused by an external force. In consequence, an increase in the external diameter of the tower and an increase in the shell thickness associated with an increase in size of the wind turbine generator can be minimized, thereby achieving a significant advantage of allowing for an increase in size of the wind turbine generator while avoiding constraints, such as a transportation restriction.

By suppressing deformation of the tower caused by an external force in each construction phase of the wind turbine generator, constraints with respect to the construction process can be alleviated, thereby facilitating application to various construction methods.

EXPLANATION OF REFERENCE

Figure 1:
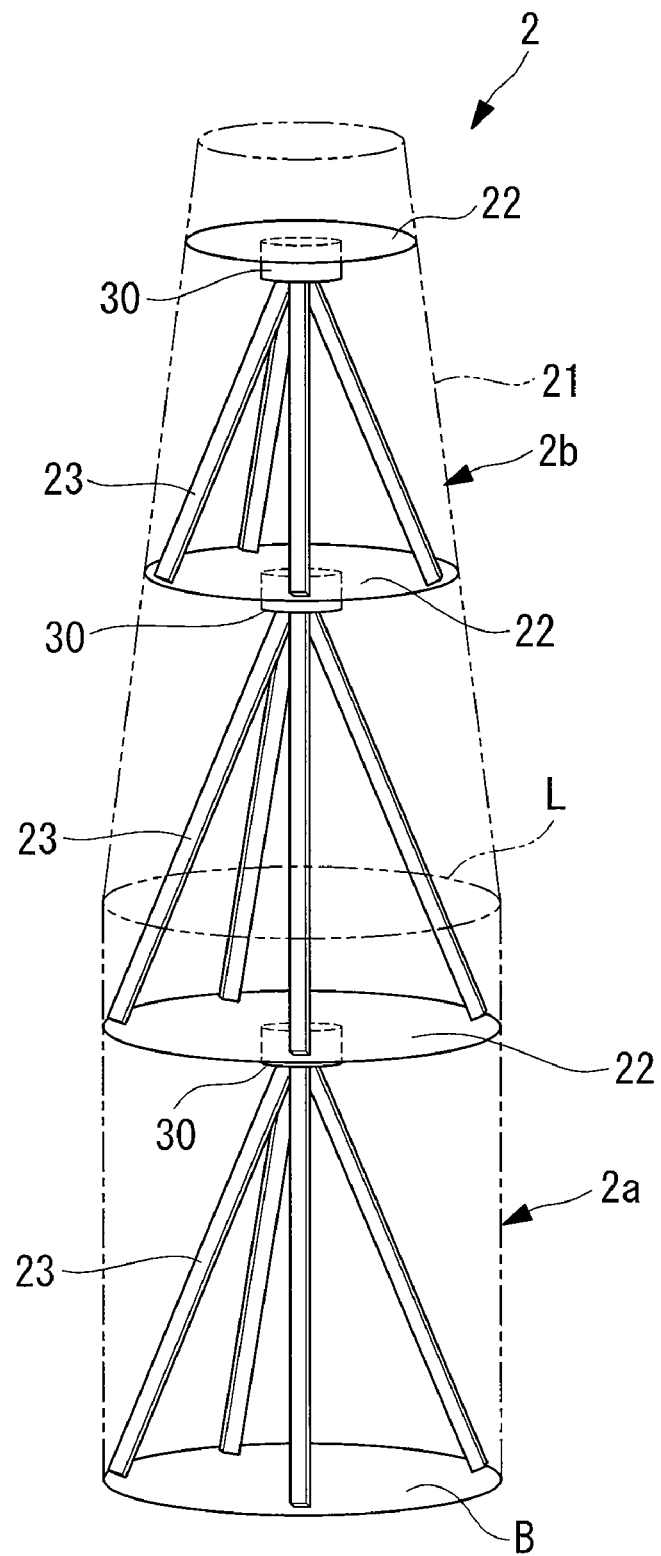
FIG. 1 is a perspective view of a tower structure, showing an embodiment of a wind turbine tower according to the present invention.

1: wind turbine generator
2: wind turbine tower
2a, 2b: tower section
3: nacelle
4: rotor head
5: wind turbine blade
21: tower shell
22: platform
23: load transmission member
30: elastic bearing
B: base
L: joint line

DETAILED DESCRIPTION OF THE INVENTION

Embodiments of a wind turbine tower and a wind turbine generator according to the present invention will be described below with reference to the drawings.

Figure 4:
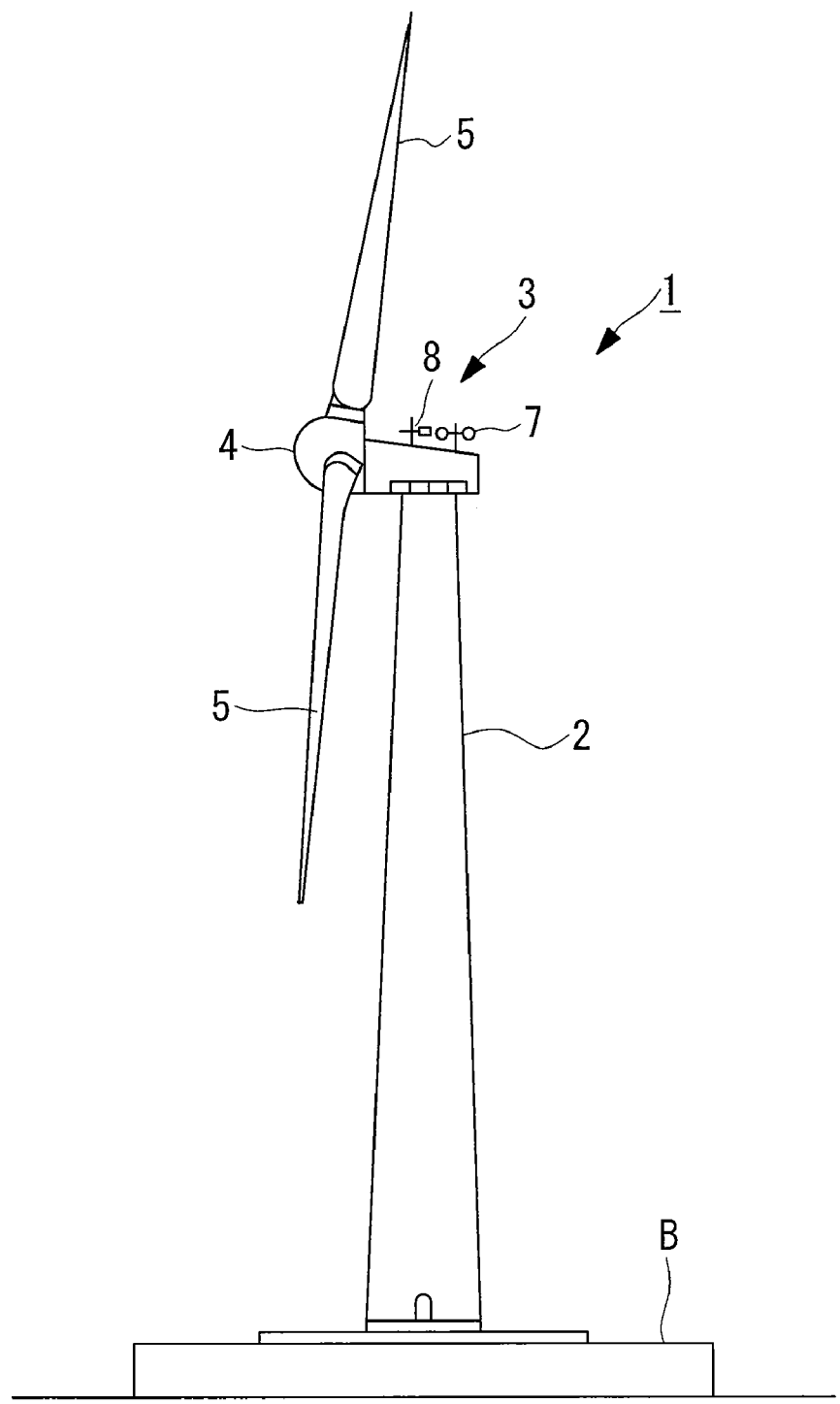
FIG. 4 is a side view schematically showing a wind turbine generator equipped with the tower structure of the present invention.

A wind turbine generator 1 shown in FIG. 4 includes a wind turbine tower (referred to as "tower" hereinafter) 2 standing upright on a base B, a nacelle 3 disposed on the top of the tower 2, and a rotor head 4 provided at one end of the nacelle 3 and supported in a rotatable manner about a rotation axis extending substantially in the horizontal direction.

Multiple (e.g., three) wind turbine blades 5 are attached to the rotor head 4 so as to extend radially around the rotation axis thereof. Thus, the force of wind striking the wind turbine blades 5 in the rotation-axis direction of the rotor head 4 is converted to power that rotates the rotor head 4 about the rotation axis.

An anemometer 7 that measures the ambient wind speed value and an anemoscope 8 that measures the wind direction are disposed at an appropriate position (such as an upper section) of an outer peripheral surface of the nacelle 3.

The tower 2 shown in FIG. 1 is of a monopole type in which mainly a steel tower shell 21 is configured to bear load, and the required tower height is ensured by vertically connecting two tower sections 2a and 2b together along a joint line L.

The number of tower sections that constitute the tower 2 (i.e., the number of members into which the tower 2 can be divided) is not particularly limited since the number varies depending on the height or the like of the tower 2.

The aforementioned tower 2 includes platforms 22 that are connected to an inner wall of the tower shell 21 having a cylindrical shape and that divide an internal space of the tower in the vertical direction, elastic bearings 30 attached by fixing one end thereof to the corresponding platforms 22, and load transmission members 23 that are disposed within the internal space of the tower and connect the other end of the elastic bearings 30 to the platforms 22 or the base B so as to transmit a horizontal force from the elastic bearings 30 to the platforms 22 or the base B.

Specifically, the tower 2 shown in the drawing includes three platforms 22 that divide the cylindrical internal space, located above the base B, of the tower in the vertical direction, and in each of the three divided internal spaces of the tower, an elastic bearing 30 and load transmission members 23 that transmit a horizontal force from the elastic bearing 30 are disposed.

The number of platforms 22 and the number of spaces into which the internal space of the tower is divided are not particularly limited since these numbers vary depending on the height or the like of the tower 2.

The platforms 22 are disk-shaped members formed of steel plates or the like fixed to inner wall surfaces of the tower sections 2a and 2b that constitute the tower 2, and are also used as scaffolds when, for example, constructing the wind turbine generator 1. These platforms 22 are rigidly connected to the inner peripheral surface of the tower 2 by, for example, welding disks thereto around the entire circumference. The platforms 22 are each provided with openings necessary for passing cables, an elevator, and the like therethrough, in addition to an opening through which a person can pass.

A fixed position of a platform 22 is a position slightly shifted downward from the joint section where the tower sections 2a and 2b are connected. Specifically, in the configuration example in FIG. 1, the fixed position of the platform 22 closest to the joint section is set such that the position is slightly lower than the joint line L where the tower sections 2a and 2b are connected.

The elastic bearings 30 used here are composed of a material, such as multilayer rubber, having a damping component in addition to an elastic component. One end of each elastic bearing 30 is connected to the tower shell 21 via the corresponding platform 22, whereas the other end has one or a plurality of the load transmission members 23 connected thereto. In the configuration example shown in the drawing, the upper surface of each elastic bearing 30 is fixed to near the center of the lower surface of the corresponding platform 22 (i.e., the center of axis of the tower 2).

The load transmission members 23 are composed of steel or the like and connect the other end of the elastic bearings 30 to the platforms 22 or the base B.

In the configuration example shown in the drawing, four load transmission members 23 are connected to each elastic bearing 30. In this case, the four load transmission members 23 are arranged at a 90-degree pitch in the circumferential direction of the corresponding platform 22, and the upper end thereof is fixed to near the central position of the platform 22 by welding or by means of bolts or the like, whereas the lower end thereof is fixed to near the outer peripheral edge of the platform 22 by welding or by means of bolts or the like. Specifically, the upper end of each load transmission member 23 is connected to the tower shell 21 via the corresponding elastic bearing 30.

In consequence, each load transmission member 23 is inclined outward from the center of the tower 2 towards the inner peripheral surface thereof. The lower ends of the load transmission members 23 provided at the lowest level are fixed to the base B, instead of to a platform 22, by welding or by means of bolts or the like.

Accordingly, in the tower 2 of the above embodiment, the elastic bearings 30 are disposed within the tower 2 so that a horizontal force received by the upper part of the tower 2 is dispersed to the lower part of the tower 2 or the base B via the elastic bearings 30, the load transmission members 23, and the platforms 22, thereby reducing the load acting on the interior of the tower shell 21 and suppressing deformation of the tower 2 caused by an external force.

Figure 2:
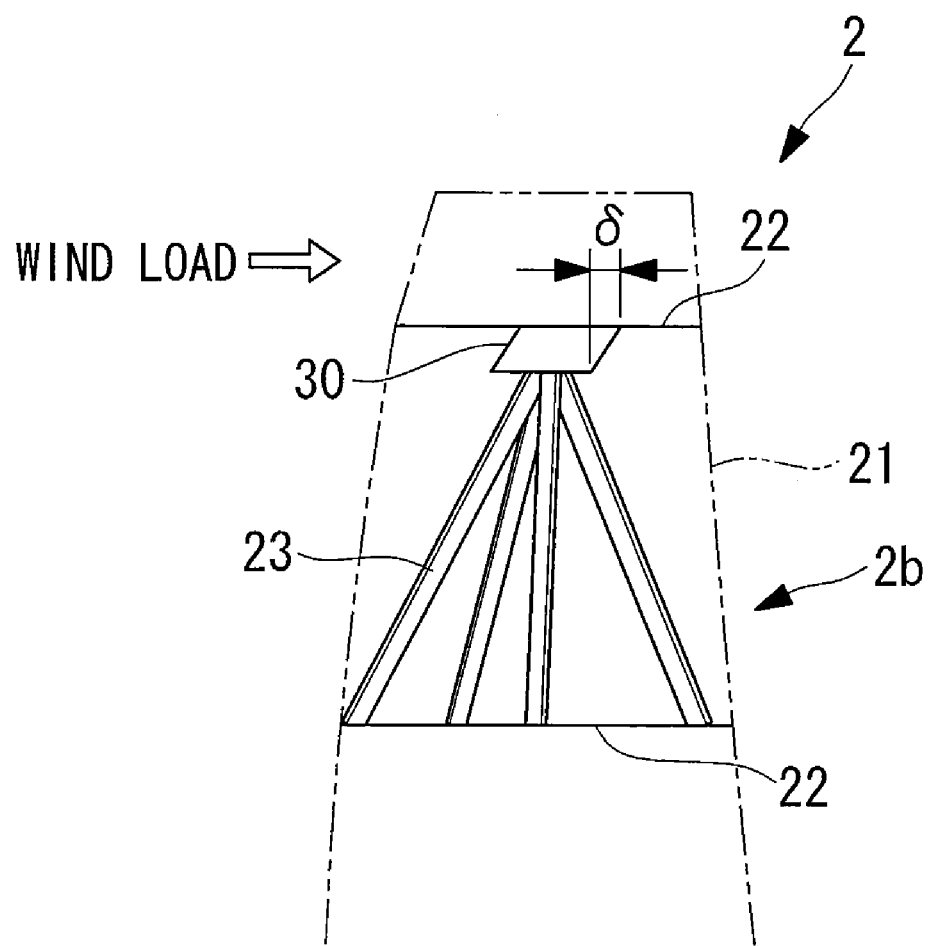
FIG. 2 is a diagram illustrating a state where relative displacement of an elastic bearing occurring due to deformation of the tower causes the load at an upper part to be transmitted to a lower part in the tower structure shown in FIG. 1.

With the tower 2 having such a configuration, when the tower 2 receives a horizontal force, the tower shell 21 receiving the horizontal force, such as wind load, becomes deformed, as shown in, for example, FIG. 2, and this deformation causes the platforms 22 to be displaced substantially in the horizontal direction. In this case, because the horizontal displacement amount at the position of each of the platforms 22 varies among them, relative displacement occurs between the positions of the elastic bearings 30 fixed to the platforms 22 and the positions where the lower ends of the load transmission members 23 are connected to the platforms 22; however, this relative displacement causes the elastic bearings 30 to deform, and a horizontal reaction force thereof is transmitted to a lower part of the tower shell 21 via the load transmission members 23 and the platforms 22.

Specifically, regarding the relationship between an upper-end position of each elastic bearing 30 fixed to the lower surface of the corresponding platform 22 and a lower-end position of the elastic bearing 30, which is a position where upper ends of the corresponding load transmission members 23 are connected to the elastic bearing 30, the lower-end position of the elastic bearing 30 receives more displacement restraint due to the load transmission members 23, causing relative displacement δ of the elastic bearing 30 to occur. This relative displacement δ causes a horizontal force to act on the disposed position of the elastic bearing 30 in a direction opposite to that of an external force acting on the tower, so as to reduce the load at the position of the elastic bearing 30 and cause a reaction force thereof to be transmitted to the joint position between the lower ends of the load transmission members 23 and the tower shell 21 via the load transmission members 23.

In consequence, in the tower shell 21 between the platform 22 at the upper-surface position of the elastic bearing 30 and the platform 22 at the lower ends of the load transmission members 23, the load acting on the tower shell 21 is reduced by an amount equivalent to the horizontal force produced in the elastic bearing 30.

Accordingly, by disposing a plurality of combinations of platforms 22, load transmission members 23, and elastic bearings 30 described above (collectively referred to as "elastic bearing units" hereinafter) within the tower 2, the elastic bearing units can each reduce the load acting on the tower shell 21 between a pair of platforms 22 and can ultimately disperse the horizontal force to the base B.

Therefore, between an upper-surface position of each elastic bearing 30 and a lower-surface position thereof that connects the lower ends of the load transmission members 23 to the tower 2, the shell thickness of the tower shell 21 can be reduced due to the reduction of the load acting thereon. Consequently, even with the reduced shell thickness, required strength can still be obtained between the upper-surface position of each elastic bearing 30 and the lower-surface position thereof that connects the load transmission members 23 to the tower 2.

In the above embodiment, because the elastic bearing 30 in each elastic bearing unit reduces the load acting on the tower shell 21, the reaction displacement of the tower 2 can be reduced even when an external force acting in the horizontal direction is received during operation of the wind turbine generator 1. In addition, when constructing the wind turbine generator 1, the reaction displacement of the tower 2 can be reduced so long as the elastic bearing units are installed midway through construction of the tower 2, thereby alleviating the construction conditions. Specifically, installation conditions set at the time of assembly and construction of the tower 2 (for example, a period in which the same assembled state is permitted in the mid-phase of construction) or undesired states or conditions can be alleviated, thereby allowing for a flexible construction process.

In this case, the transmission rate of a horizontal force from an upper part to a lower part can be adjusted by appropriately adjusting the spring constant of the elastic bearings 30, and the natural frequency of the tower 2 can be adjusted by appropriately adjusting the spring constant and the damping properties of the elastic bearings 30. With regard to the spring constant and the damping properties in this case, simulation based on design data or the like may be implemented in each construction phase or upon completion, and optimal values obtained from values estimated for various conditions may be used. In detail, by setting a spring constant in accordance with an expected reduction of the load acting on the tower shell 21 and adjusting the natural frequency of the tower 2 on the basis of the spring constant and the damping properties, that is, by setting the spring constant and the damping properties of the elastic bearings 30 so as to endow them with an appropriate ability to suppress deformation caused by an external force that varies depending on whether the wind turbine generator 1 is in the mid-phase of construction, whether the wind turbine generator 1 is completed, or whether the wind turbine generator 1 is in operation, and to prevent resonance in the tower, the load acting on the tower shell 21 can be reduced and constraints with respect to the construction process can be alleviated.

With regard to the load transmitted from the upper part of each elastic bearing unit to the lower part of the elastic bearing unit, that is, the load transmitted from the platform 22 to the tower shell 21 via the corresponding load transmission members 23, the load transmitted position is lower than the joint line L since the position of the platform 22 is slightly shifted downward from the joint line L. Therefore, because the load acting on the joint line L is reduced, the size and the number of joining bolts required as members for connecting the tower sections 2a and 2b can be reduced.

The aforementioned elastic bearings 30 composed of multilayer rubber are preferably attached in a state where they are pre-compressed by the load transmission members 23.

The reason for this is that when a tensile force is applied to multilayer rubber, the multilayer rubber becomes delaminated, causing the elastic bearings 30 to break; therefore, the elastic bearings 30 are preferably attached by securing the load transmission members 23 at predetermined positions while maintaining a pre-compressed state using a tool, such as a jack.

Although one elastic bearing 30 is provided between platforms 22 in the above embodiment, a configuration in which multiple elastic bearings 30 are appropriately disposed therebetween and are each connected to the load transmission members 23 is also permissible. Specifically, with regard to a combination of the elastic bearings 30 and the load transmission members 23 between platforms 22, a plurality of sets, for example, may be installed uniformly or symmetrically in plan view of the platforms 22, thereby allowing for dispersion of the load in each set.

Figure 3:
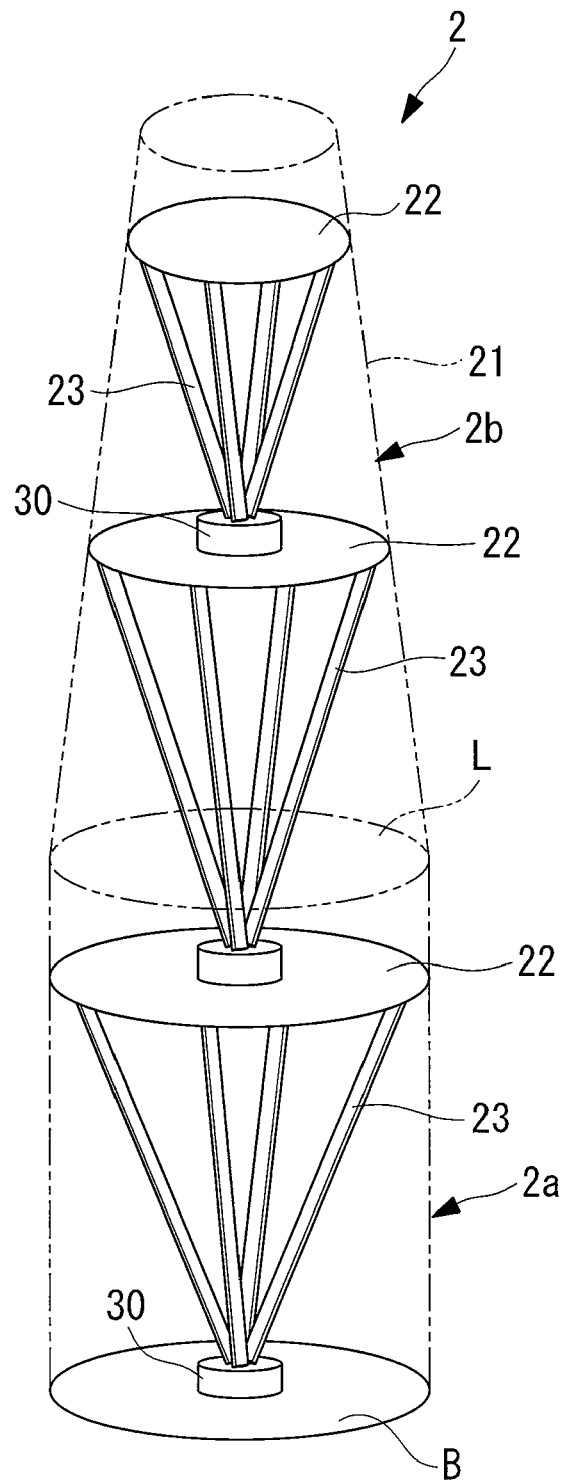
FIG. 3 is a perspective view of a tower structure, showing a modification of the wind turbine tower according to the present invention.

Although the upper surface of each elastic bearing 30 is fixed to the lower surface of the corresponding platform 22 in the above embodiment, the vertical positional relationship between the elastic bearings 30 and the load transmission members 23 may be inverted, as in, for example, a modification shown in FIG. 3. Specifically, in the configuration example shown in the drawing, the upper ends of the load transmission members 23 are fixed to near the outer periphery of the lower surface of each platform 22, and an elastic bearing 30 is fixed to near the center of the upper surface of the platform 22 that is one level lower or the upper surface of the base B. The lower ends of the load transmission members 23 are fixed to the elastic bearings 30.

By using elastic bearing units having such a configuration, the same advantages as those of the above embodiment can be achieved.

With the above embodiment, a horizontal force received by an upper part of the monopole-type tower 2 is dispersed to a lower part of the tower 2 or to the base B, whereby the load acting on the tower shell 21 can be reduced, and deformation of the tower 2 caused by an external force can be suppressed. In consequence, an increase in the external diameter of the tower 2 and an increase in the shell thickness associated with an increase in size of the wind turbine generator 1 can be minimized, thereby avoiding constraints, such as transportation restrictions, which are a hindrance to the size increase.

With regard to each construction phase of the wind turbine generator 1, construction management is facilitated because the tower 2 can be prevented from being fatigue-damaged by a resonant wind force that varies depending on each construction phase.

The present invention is not limited to the above embodiments, and appropriate modifications are permissible, such as applying the invention to an upwind-type or downwind-type, so long as they do not depart from the spirit of the invention.

The invention claimed is:

1. A monopole-type wind turbine tower in which mainly a tower shell is configured to bear a load, the tower shell comprises two or more tower sections,
   wherein each of the tower sections comprised:
   a platform connected to an inner wall of the tower shell and dividing an internal space of the tower in the vertical direction;
   an elastic bearing attached by fixing one end thereof to a central position of the platform or a central position of a base of the tower shell; and
   a plurality of load transmission members disposed in the internal space of the tower,
   wherein an end of each of the plurality of load transmission members connects another end of the elastic bearing to the platform located at a position facing the elastic bearing or to the base so as to transmit a horizontal force from the elastic bearing to the tower shell or the base, wherein
   an end of each of the plurality of load transmission members is connected to the elastic bearing,
   another end of each of the plurality of load transmission members is fixed to a vicinity of an outer peripheral edge of the platform or the base opposite to the elastic bearing with a predetermined interval, and
   the plurality of load transmission members are inclined outward from a center of axis of the tower towards the inner peripheral surface thereof.

2. The wind turbine tower according to claim 1, wherein the elastic bearing is multilayer rubber attached in a state where the multilayer rubber is pre-compressed by the plurality of load transmission members.

3. The wind turbine tower according to claim 1, wherein the tower shell includes a joint section that connects multiple divided tower sections, and wherein the plurality of load transmission members are joined to the tower shell between the tower sections that are different from each other.

4. The wind turbine tower according to claim 1, wherein a spring constant of the elastic bearing is set in accordance with an expected reduction of load acting on the tower shell.

5. A wind turbine generator that generates electricity by causing a rotor head that rotates about a substantially horizontal rotation axis when a wind turbine blade receives a wind force to drive a generator disposed within a nacelle,
   wherein the wind turbine generator comprises a wind turbine tower according to claim 1 that stands upright on a base, and wherein the nacelle is disposed on top of the wind turbine tower.

* * * * *